United States Patent [19]

Mraz

[11] Patent Number: 4,951,801
[45] Date of Patent: * Aug. 28, 1990

[54] ARTICULATED MOBILE CONVEYOR APPARATUS

[75] Inventor: Dennis Z. Mraz, Saskatoon, Canada

[73] Assignee: DM Enterprises Inc., Saskatoon, Canada

[*] Notice: The portion of the term of this patent subsequent to Jun. 27, 2006 has been disclaimed.

[21] Appl. No.: 144,846

[22] Filed: Jan. 14, 1988

Related U.S. Application Data

[63] Continuation-in-part of Ser. No. 757,852, Jul. 22, 1985, Pat. No. 4,842,130, which is a continuation-in-part of Ser. No. 670,563, Nov. 13, 1984, abandoned, which is a continuation-in-part of Ser. No. 640,749, Aug. 14, 1984, abandoned.

[51] Int. Cl.$^5$ .............................................. B65G 41/00
[52] U.S. Cl. .................................... 198/303; 198/839; 198/314
[58] Field of Search ............... 198/303, 304, 309, 311, 198/312, 314, 315, 317, 806, 807, 839, 842, 861.2, 861.3

[56] References Cited

U.S. PATENT DOCUMENTS

| | | |
|---|---|---|
| 2,525,555 | 10/1950 | Manierre . |
| 2,733,806 | 2/1956 | Lanier, Jr. .................... 198/839 X |
| 2,748,918 | 6/1956 | Mercier ........................ 198/561 |
| 2,799,386 | 7/1957 | Moon ........................... 198/303 X |
| 2,805,758 | 9/1957 | Madeira et al. . |
| 2,873,021 | 2/1959 | McWhorter ................. 198/839 X |
| 2,903,122 | 9/1959 | Geilenberg . |
| 2,966,984 | 1/1961 | Moon . |
| 3,003,612 | 10/1961 | Poundstone . |
| 3,135,374 | 6/1964 | Anderson . |
| 3,307,493 | 3/1967 | Keller et al. . |
| 3,701,411 | 10/1972 | McGinnis ..................... 198/303 |
| 3,863,752 | 2/1975 | Sibley ........................... 198/303 |
| 3,974,907 | 8/1976 | Shaw et al. . |
| 4,084,683 | 4/1978 | Moss ............................ 198/806 X |
| 4,217,981 | 8/1980 | Briggs .......................... 198/839 |
| 4,256,213 | 3/1981 | Shaw et al. ................... 198/303 |

FOREIGN PATENT DOCUMENTS

| | | |
|---|---|---|
| 1251216 | 9/1967 | Fed. Rep. of Germany ...... 198/839 |
| 0575283 | 6/1924 | France .............................. 198/839 |
| 0028794 | 3/1925 | France .............................. 198/839 |

Primary Examiner—Joseph J. Rolla
Assistant Examiner—James R. Bidwell
Attorney, Agent, or Firm—Staas & Halsey

[57] ABSTRACT

A mobile articulated conveyor apparatus includes a plurality of modular carriages pivotally interconnected to each other to enable relative articulated movement between adjacent carriages about upstanding pivot axes generally normal to the longitudinal axes of the carriages. Each carriage has a pair of drive wheels intermediate its length, and drive motors are carried by selected ones of the carriages to effect driving rotation of the drive wheels on each carriage. A belt guidance arrangement is interposed between the adjacent ends of each pair of pivotally interconnected carriages and cooperates with idler roller assemblies to guide an endless conveyor belt along the length of the conveyor apparatus. The belt guidance arrangements enable bending of the belt in generally horizontal planes upon relative articulated movement between the carriages while maintaining the belt in predetermined trained relation on the carriages.

11 Claims, 3 Drawing Sheets

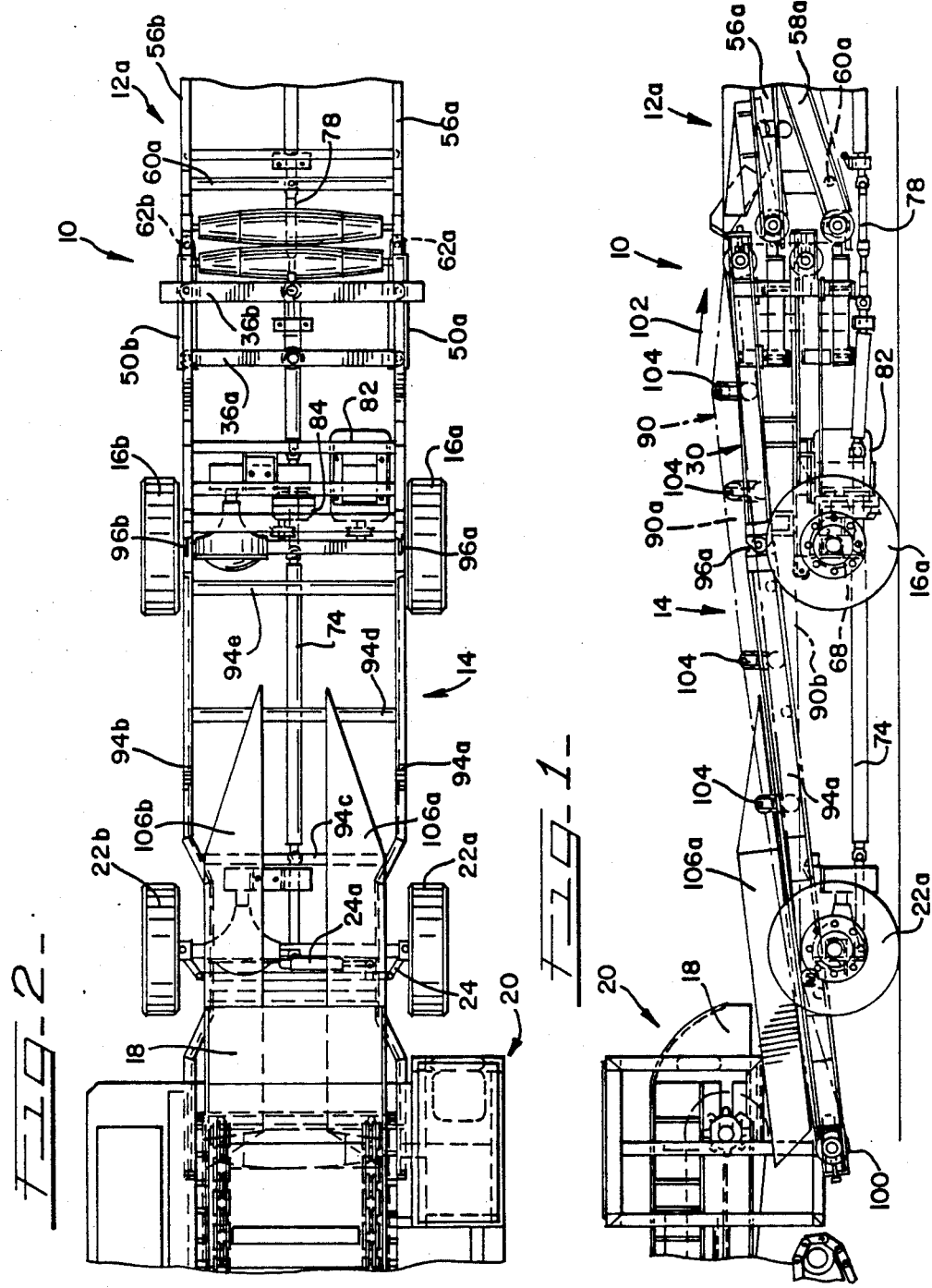

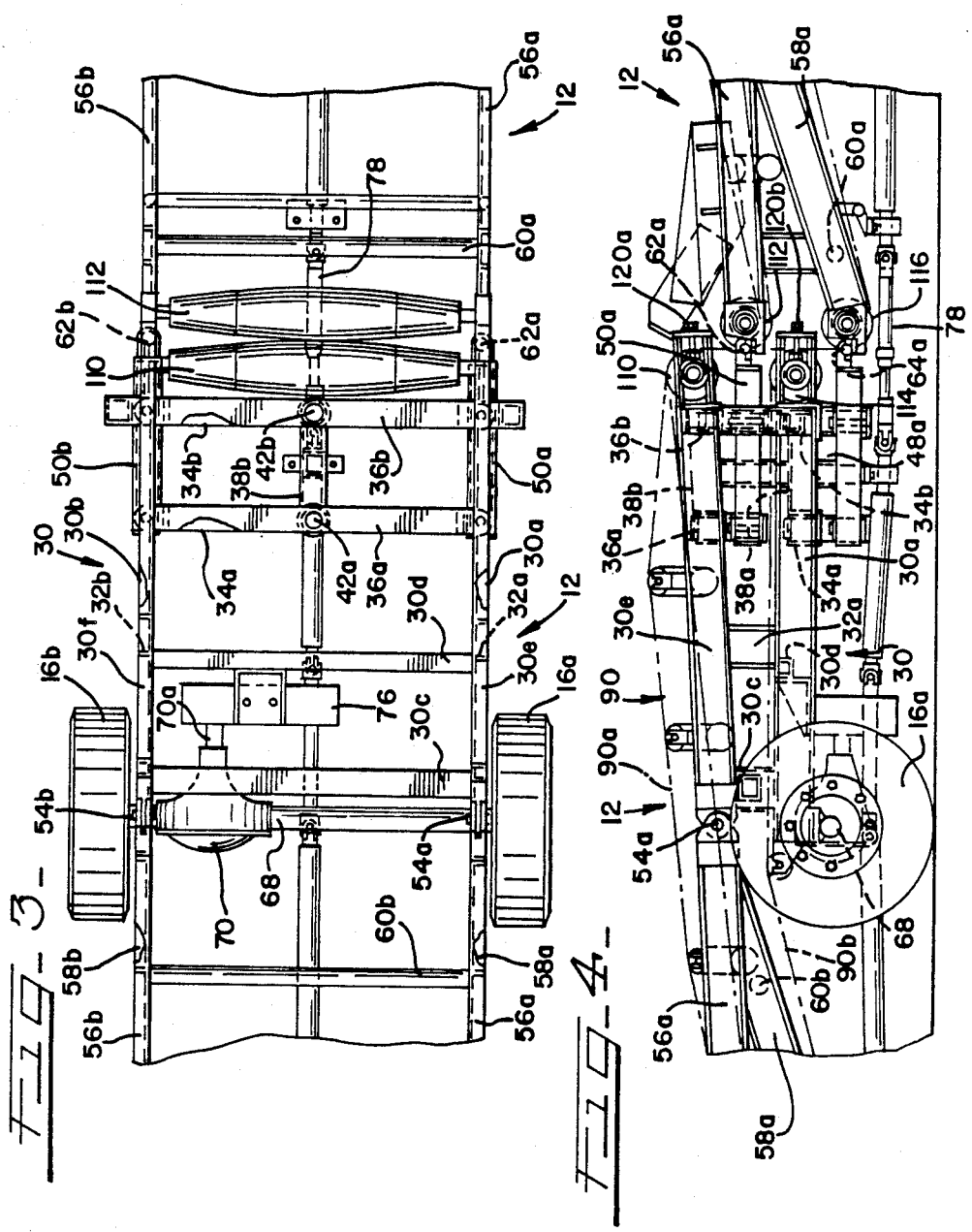

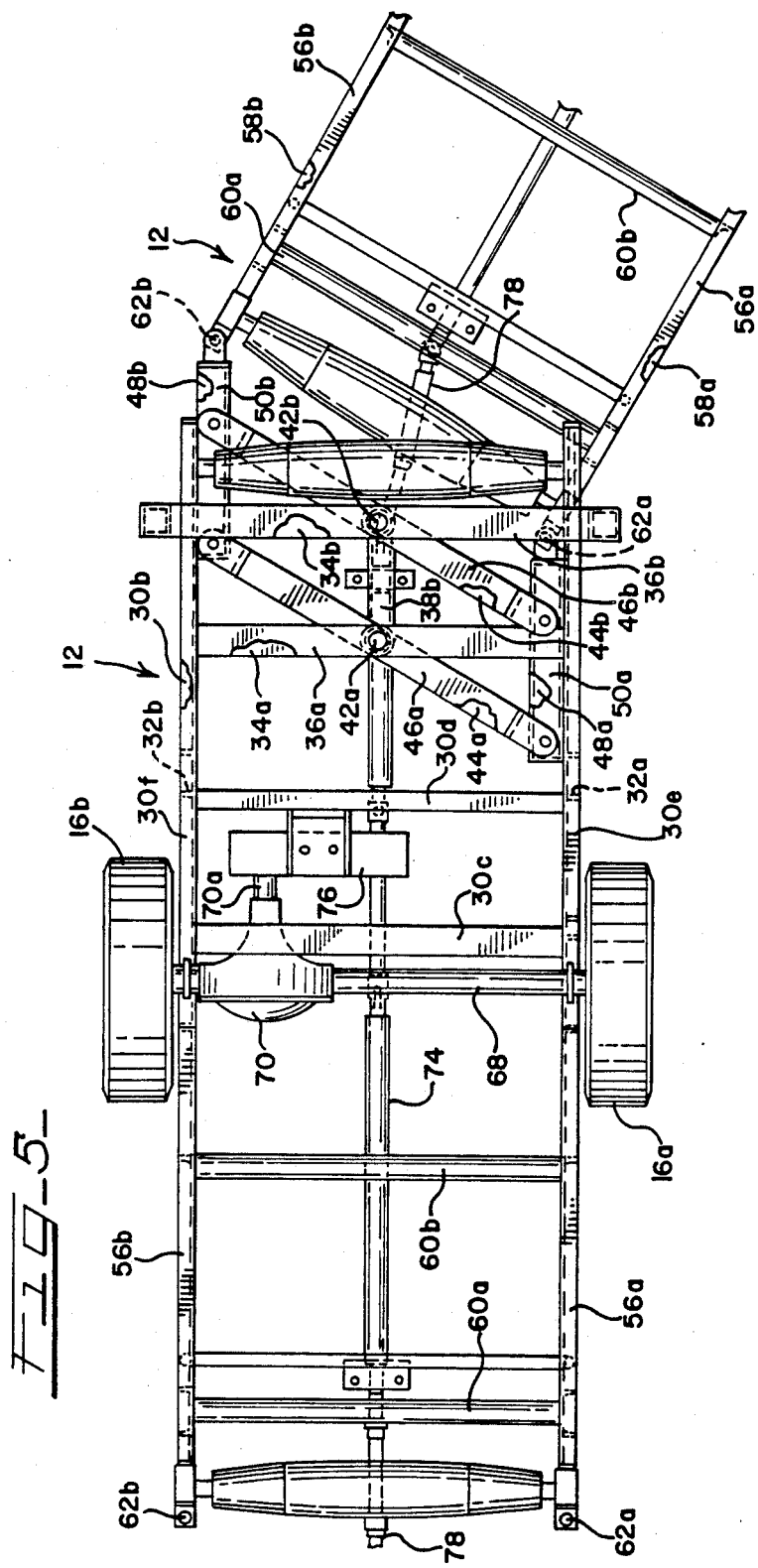

ARTICULATED MOBILE CONVEYOR APPARATUS

BACKGROUND OF THE INVENTION

This application is a continuation-in-part from pending application Ser. No. 757,852, filed Jul. 22, 1985 U.S. Pat. No. 4,842,130, which is a continuation-in-part from Ser. No. 670,563, filed Nov. 13, 1984, now abandoned, which is a continuation-in-part from Ser. No. 640,749, filed Aug. 14, 1984, now abandoned, all incorporated herein by reference.

The present invention relates generally to articulated conveyor apparatus, and more particularly to a novel self-propelled mobile articulated conveyor apparatus having a plurality of pivotally interconnected modular powered carriages which support an endless conveyor belt along substantially the full length of the conveyor while facilitating angular articulation between the various modular carriages.

It is a common practice in the mining industry, and particularly in subterranean mines, to employ endless belt type conveyors to convey the mined material, such as coal or other mineral ores, in generally bulk form from a mining machine operating at a mine face to a point spaced some distance from the mine face where the mined material is transferred to a permanently installed belt conveyor system or is transferred to haulage vehicles. In underground mining, the mining machine is frequently worked in a manner which results in interconnected passageways and chambers so that the path from the mine entrance, or the conveyor off-loading area, to the mine face is nonlinear. It is thus highly desirable that the conveyor apparatus which receives and conveys mined material from the mining machine be capable of articulated movement so as to enable the conveyor to be maneuvered through nonlinear passages to the mining machine. In the case of relatively long mobile conveyors, it is also desirable that the conveyor apparatus be capable of tracking so that successive wheel supported portions or lengths of the conveyor follow in substantially the same track or path traversed by the preceding or forward conveyor sections.

Attempts have been made to provide such mobile articulated conveyors. See, for example, U.S Pat. No. 3,863,752 (Sibley) and No. 4,256,213 (Shaw, et al.). The mobile conveyor disclosed in the Sibley patent employs a plurality of carrier or carriage units which are connected to facilitate end-to-end articulated movement. An endless conveyor belt is supported along substantially the full length of the interconnected carriers. A relatively complex arrangement of swingable belt support rollers are required at the junctions of adjacent carriers so as to enable belt bending as the carriers undergo angling relative to each other. The aforementioned Shaw, et al. patent discloses a mobile conveyor having a plurality of connected carriages which are operative to track each other during traversing of a mine floor surface. Each carriage has driven support wheels intermediate its length, and supports a discrete endless conveyor belt and associated belt drive means to facilitate transfer of bulk material along a chain of connected conveyor carriages.

SUMMARY OF THE INVENTION

One of the primary objects of the present invention is to provide a novel mobile articulated conveyor apparatus which includes a plurality of driven modular carriages pivotally interconnected so as to track one behind the other during longitudinal movement, the modular carriages cooperating to support an endless conveyor belt extending the full length of the connected carriages while enabling bending of the belt between the modular carriages without need for auxiliary belt edge control devices as heretofore required to restrict lateral movement of the belt during bending.

A more particular object of the present invention is to provide a novel mobile articulated conveyor apparatus as aforedescribed wherein adjacent ends of the modular carriages support belt bending guide rollers operative to maintain the conveyor belt trained on the guide rollers during articulated movement of the modular carriages through a range of angles without need for belt edge control devices.

Further objects, advantages and features of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a fragmentary elevational view of a mobile articulated conveyor apparatus constructed in accordance with the invention, the conveyor apparatus being illustrated in conjunction with the discharge end of a mining machine and with the conveyor belt being shown in phantom;

FIG. 2 is a fragmentary plan view of the articulated conveyor apparatus illustrated in FIG. 1, but with the conveyor belt, guide chutes and associated intermediate idler rollers removed;

FIG. 3 is an enlarged fragmentary plan view of a portion of the conveyor apparatus illustrated in FIG. 2;

FIG. 4 is a fragmentary elevational view of the conveyor apparatus as illustrated in FIG. 3; and FIG. 5 is a fragmentary plan view similar to FIG. 3, but on an enlarged scale and illustrating the modular carriages in angled relation to each other, the conveyor belt, guide chutes and idler rollers being removed for purposes of clarity.

DETAILED DESCRIPTION

Referring now to the drawings, and in particular to FIGS. 1 and 2, a fragmentary portion of a mobile articulated conveyor apparatus constructed in accordance with the present invention is indicated generally at 10. Briefly, the articulated conveyor apparatus 10 includes a plurality of substantially identical modular carriages or carrier units, each of which is indicated generally at 12, which are pivotally interconnected to each other so as to enable articulated movement therebetween as the conveyor apparatus moves longitudinally. FIGS. 1 and 2 illustrate at 12a the forward end portion of the first modular carriage 12 in line behind a material receiving and loading conveyor module, indicated at 14, while FIGS. 3 and 4 illustrate in plan and elevational views the rearward portion of the first modular carriage and the forward end of the next successive modular carriage in the train of pivotally connected modular carriages. The mobile articulated conveyor apparatus 10 may include a train of upwards of thirty eight or more modular carriages so as to approach 500 feet or more in length.

As will be described, the modular carriages 12 have pairs of ground-engaging drive wheels 16a and 16b which are positioned to enable each modular carriage to track or traverse substantially the same path traversed by the preceding modular carriage in the train of modular carriages. As illustrated in FIG. 1, the forwardmost modular carriage 12 is pivotally interconnected to the rearward end of the material receiving modular carriage 14 which constitutes a loading conveyor module to receive bulk mined material from a discharge trough 18 on a continuous mining machine or the like indicated generally at 20.

As will be described, the drive wheels 16a, b of each modular carriage 12 are operatively associated with a common drive line which extends substantially the full longitudinal length of the conveyor apparatus and is driven through drive means in the form of electric drive motors carried on selected ones of the modular carriages. By employing a common drive line, the drive wheels on all of the modular carriages are driven at substantially the same rotational speed so as to maintain the interconnected modular carriages in relatively fixed longitudinal relation to each other and maintain the desired tracking of successive modular carriages. The forward loading conveyor module 14 has a second or forward pair of driven ground-engaging wheels 22a and 22b which are steerable through a conventional tie rod assembly 24 and fluid pressure cylinder 24a so as to enable selective steering of the conveyor apparatus in a generally longitudinal direction.

Turning now to a more detailed description of the mobile articulated conveyor apparatus 10, each of the modular carriages 12 includes a generally rectangular rigid frame, indicated generally at 30, having laterally opposite longitudinally extending frame members 30a and 30b maintained in fixed parallel relation by transverse frame members 30c and 30d. Each frame 30 also includes a pair of laterally spaced upper frame members 30e and 30f which extend longitudinally of the modular carriage in overlying relation to the frame members 30a and 30b, respectively, and are upwardly inclined toward the right-hand or rearward end of the associated carriage. The frame member 30e, f are maintained in rigid relation with frame members 30a, b through the transverse frame member 30c and a pair of upstanding channels 32a and 32b.

Each rigid carriage frame 30 further includes a pair of spaced transverse frame members 34a and 34b affixed to and between the rearward ends of frame members 30a, b, and a pair of similar transverse frame members 36a and 36b secured to and between the rearward ends of the upper longitudinal frame members 30e and 30f in overlying relation to frame members 34a, b. A pair of vertically spaced frame members 38a and 38b extend longitudinally of the carriage frame 30 and have their opposite ends affixed to the corresponding pairs of transverse frame members 34a, b and 36a, b. Each of the transverse frame members 34a, 34b and 36c, 36b supports a downwardly extending pivot pin at its midlength, such as indicated at 42a and 42b in FIGS. 3 and 5. The pivot pins pivotally support lower and upper pairs of equal length parallel support arms 44a, 44b and 46a, 46b. The opposite ends of the lower support arms 44a, b are pivotally connected, respectively, to connector arms 48a, b so as to form a parallelogram arrangement wherein the connector arms 48a, b are maintained parallel to the longitudinal axis of carriage 12, as illustrated in FIGS. 3-5.

The opposite ends of the support arms 46a, b are similarly pivotally connected to laterally opposite connector arms 50a, b which are vertically coplanar with the corresponding connector arms 48a, b and form a parallelogram with the support arms 46a, b. In this manner, the equal length connector arms 48a, b and 50a, b are maintained parallel to the longitudinal axis of the carriage and undergo movement in opposite directions upon imparting longitudinal movement to either pair of connector arms 48a, 50a, or 48b, 50b.

The rearward ends of the connector arms 48a, b and 50a, b define pivot connector means in the form of cylindrical bore pivot sockets which collectively are adapted for releasable pivotal connection to the forward end of the next adjacent modular carriage 12 in a manner to enable articulated movement between the connected modular carriages in a generally horizontal plane. Such articulated movement takes place about a substantially vertical imaginary pivot axis which vertically intersects the longitudinal axes of the connected modular carriages at the point at which the longitudinal axes intersect during relative angling of the modular carriages. In this manner, the actual mechanical pivotal connections between adjacent carriages are made laterally outwardly from the longitudinal axes of the connected carriages so as not to interfere with transverse conveyor belt guide rollers adjacent the ends of the carriages, as well be described.

The rigid frame 30 of each modular carriage 12 has its upper longitudinal frame members 30e and 30f connected through transverse pivot pins 54a and 54b to the rearward ends of forwardly extending laterally spaced longitudinal frame members 56a and 56b, respectively. The forwardly extending frame members 56a, b have underlying downwardly inclined frame members 58a and 58b which are fixedly secured to members 56a, b and are maintained in parallel spaced relation by transverse frame members 60a, b. The forward ends of the frame members 56a,b and 58a, b are normally generally vertically aligned and have upstanding cylindrical pivot pins or stub shafts 62a, b and 64a, b, respectively, mounted thereon adapted to be received and retained within the aforedescribed cylindrical bores formed on the rearward ends of the connector arms 48a, b and 50a, b. The pivot pins 62a, b and 64a, b enable releasable connection to the corresponding cylindrical pivot sockets on the connector arms 48a, b and 50a, b of an adjacent carriage 12 to thus establish pivotal interconnection between the forward end of each modular carriage and the rearward end of a similar modular carriage. The aforedescribed parallelogram support of the connector arms 48a, b and 50a, b enables articulated movement between adjacent carriages 12 in a generally horizontal plane, but with the cylindrical pivot pins 62a, b and 64a, b prevents any substantial pivotal movement between the adjacent connected carriage ends in a vertical plane. The adjacent ends of the successive modular carriages 12 are thus connected in generally fixed relation to each other, as considered in a vertical plane. The successive carriage may undergo relative pivoted movement in a vertical plane about horizontal pivot axes defined by the axially aligned pivot pins 54a, b.

The ground engaging drive wheels 16a and 16b on each carriage 12 are affixed to the outer ends of axially aligned transverse axles (not shown) which are supported in transverse axle sleeves 68 fixed to the forward ends of the frame members 30a and 30b so as to lie midlength of the associated carriages. Each pair of drive wheels 16a, b is rotatably driven by means of a conventional differential drive 70 to which the inner ends of the transverse axles are connected. The differential drive 70 has an input shaft 70a coupled to a longitudinal extending drive line 74 through a suitable drive coupling 76. The drive line 74 may comprise a plurality of descrete axially aligned drive shafts having mutually cooperable universal joint connections. A telescoping drive shaft section 78 is employed between each pair of pivotally connected modular carriages to accommodate variable length as the adjacent ends of the carriages undergo articulated movement relative to each other in a substantially horizontal plane, as viewed in FIG. 5.

In the illustrated embodiment, power drive means in the form of electric drive motors are carried on selected ones of the interconnected modular carriages 12 so as to impart driving rotation to the drive line 74 and drive wheels 16a and 16b on each of the modular carriages. In the illustrated portion of the articulated conveyor apparatus 10, a drive motor 82 is carried by the loading conveyor module 14 and coupled, as through a belt connection, to a clutch coupling 84 operatively associated with the drive line 74 extending longitudinally of the loading conveyor module. The drive motor 82 and coupling 84 are supported by suitable transverse frame members. Similar drive motors may be carried by selected ones of the other modular carriages in the conveyor train, such as by every fourth modular carriage. If desired, a drive motor 82 and associated clutch coupling 84 could be carried by each of the modular carriages 12 to assist in driving rotation of the drive line 74 and associated drive wheels 16a, b.

In accordance with one feature of the invention, the pivotally connected modular carriages 12 cooperate to support an endless conveyor belt along the full longitudinal length of the articulated conveyor apparatus. With particular reference to FIGS. 1 and 4, an endless conveyor belt of generally conventional design is illustrated in phantom at 90. The conveyor belt 90 is of the flat flexible but generally longitudinally nonextensible type and is supported along the length of the connected modular carriages 12 so as to define an upper work reach or run 90a and a lower return reach or run 90b which extend between the forward end of the loading conveyor module 14 and the rearward end of the last modular carriage 12 (not shown) in the train of connected carriages comprising the articulated conveyor apparatus.

The forward material loading conveyor module 14 has a frame section 30 and associated connector arms 48a, b and 50a, b with associated pivot pin sockets to enable pivotable connection to the forward end of the first module carriage 12 in the conveyor apparatus 10. The loading conveyor module 14 has a pair of laterally spaced downwardly inclined frame members 94a and 94b which are pivotally connected at 96a and 96b, respectively, to the forward ends of the upper frame members 30e and 30f of rigid frame 30. The frame members 94a, b are maintained in fixed parallel relation by a plurality of transverse frame members, three of which are indicated at 94c, d and e. The aforedescribed steerable wheels 22a, b and associated axle housing are secured to the lower edges of the frame members 94a, b generally adjacent the forward ends thereof and may be driven from the drive line 74 in similar fashion to driving rotation of the drive wheels 16a, b on the module carriages 12.

The forward ends of the frame members 94a, b support a transverse belt support and guide roller or pulley 100 about which the belt 90 is guided from the forward end of its return reach 90b to begin the upper work run or reach 90a which travels in the direction of arrow 102. A plurality of transverse troughing pulleys, such as indicated at 104, are mounted in selected spaced relation along the frame members 94a and the upper frame members 30e, f of the frame 30 to guide the upper run of the belt and establish a generally U or V-shaped transverse troughing of the conveyor belt as it passes along the length of the loading conveyor module 14. Preferably, a material guide chute is provided in the form of a pair of laterally spaced elongated guide plates 106a and 106b which overlie the upper run 90a of belt 90 and assist in guiding bulk material from the discharge chute 18 of the mining machine 20 onto the conveyor apparatus 10.

In accordance with another feature of the invention, a belt guidance arrangement is provided between the rear end of the loading conveyor module 14 and the adjacent forward end of the first carriage module 12, and between the rear end of each carriage 12 and the forward end of the next successive modular carriage to prevent side slippage and minimize wear in the conveyor belt 90 as the various modular carriages undergo articulated movement relative to each other about the associated imaginary vertical axis as aforedescribed. Each such belt guidance arrangement includes upper and lower pairs of belt bending or guiding rollers, pulleys or drums, with the upper pair of belt bending rollers being operative to guide the upper work run 90a of the conveyor belt 90 while the corresponding pair of lower belt bending rollers guides the return run 90b of the conveyor belt.

In the illustrated embodiment, and with particular reference to FIGS. 3 and 4, the belt guidance arrangement between each connected pair of modular carriages 12 includes an upper pair of belt bending or guiding rollers 110 and 112 and a lower pair of belt bending or guiding rollers 114 and 116. The upper guide rollers 110 and 114 of each cooperating pair of belt guidance rollers are supported, respectively on the rearward ends of the frame members 30e, f and 30a, b of the frame 30 through suitable bearings such that the longitudinal rotational axes of the rollers are transverse to the longitudinal axis of the associated frame 30. The lower belt guidance rollers 112 and 116 of each pair of belt guiding rollers are similarly mounted on the forward ends of the frame members 56a and 58a, respectively, of the next successive carriage 12 through suitable bearings such that the rotational axes of the rollers 112 and 116 are transverse to the longitudinal axis of the associated carriage 12.

As illustrated in FIG. 4, the upper reach 90a of the conveyor belt 90 is guided over the upper guide roller or pulley 110 and downwardly around the corresponding lower guide roller or pulley 112 of the upper pair of belt guiding rollers. A plurality of idler roller assemblies 104 are mounted along the frame members 56a, b and 30e, f of each modular carriage to support the upper reach or run of the conveyor belt, preferably to establish a generally a U or V-shaped transverse troughing of the conveyor belt as it passes upwardly from the lower front end of each carriage to the upper rearward end thereof.

The return reach or run 90b of the conveyor belt 90 is similarly guided upwardly about the lower guide pulley 116 and over the upper guide pulley 114 of each lower pair of guide pulleys between adjacent modular carriages, with the intermediate reaches of the return run being guided over suitable idler pulleys as it advances to the forward end of the loading conveyor 14.

In the illustrated embodiment, the upper guide pulleys 110 and 114 of each belt guidance arrangement are adjustable longitudinally along the associated frame members 30e, f and 30a, b through suitable adjustment screws, such as indicated at 120a and 120b, which enable selective adjustment of the spacing between the pairs of rollers in the longitudinal direction of the conveyor belt. Alternatively, through predetermined design criteria including the physical characteristic of the conveyor belt, the profile configuration of the guide rollers, and the spacing between the rollers in the longitudinal direction of the belt, the pairs of guide rollers need not be made adjustable. The rollers 110, 112, 114 and 116 are preferably crowned. Predetermined crowning of the rollers serves to concentrate the tension forces in the belt near the longitudinal center of the belt and reduces tension forces in the longitudinal elements of the belt near the marginal free edges or extremities of the belt. The crowning profile of the belt guidance rollers 110–116 is preferably selected to optimize the path length of individual longitude elements in the belt taking into account the roller diameter corresponding to each longitudinal element in the belt, the vertical spacing of the belt guidance rollers of each pair, the angle of bend or articulation between adjacent modular carriages 12, and the equilibrium roller adjustment positions longitudinally of the direction of movement of the belt in compensating for relative swinging or angling movement of the rollers upon articulated movement of the carriages. The geometry of the belt guidance rollers within each belt guidance arrangement is selected to maintain stability through the full range of angular adjustment of the modular carriages relative to each other so as not to exceed the rated strength of the belt, while at the same time balancing the sum of the transverse components of tension forces in the belt acting on opposite sides of the longitudinal center of the belt.

The manner of selecting a particular belt guidance arrangement for the belt guidance rollers 110, 112 and 114, 116 is disclosed in greater detail in the aforementioned copending application, Ser. No. 757,857, and its parent applications, all of which are incorporated herein by reference. Through proper selection of the belt guidance rollers and their particular geometry and positioning, both the upper reach 90a of the conveyor belt 90 and the lower reach 90b pass generally vertically between the respective pairs of belt guidance rollers 110, 112 and 114, 116 so that the belt twists about a twist axis generally coincident with the vertical pivot axis between adjacent carriages as the belt passes from one modular carriage to another.

Thus, in accordance with the present invention, a mobile articulated conveyor apparatus is provided which includes a plurality of substantially identical modular carriages adapted to be interconnected end-to-end so as to facilitate articulated movement about generally vertical rotational axes between pairs of carriages, and wherein the associated drive wheels 16a and 16b of each carriage track the path traversed by the immediately preceding modular carriage. The conveyor belt 90 is adapted to undergo bending in a substantially horizontal plane as it is guided through the belt guidance arrangement between adjacent ends of each pair of interconnected modular carriages while maintaining desired training on the guide rollers and without being subjected to deleterious tensile stress.

While a preferred embodiment of the invention has been illustrated and described, it will be understood that changes and modifications may be made therein without departing from the invention in its broader aspects. Various features of the invention are defined in the following claims.

What is claimed is:

1. A mobile articulated conveyor apparatus comprising, in combination, a plurality of pivotally interconnected modular carriages each of which has a pair of transversely aligned support wheels intermediate its longitudinal length so as to track behind the wheels of the preceding carriage during longitudinal movement of the conveyor apparatus, selected ones of said carriages having power means operative to selectively drive the support wheels on said carriages, and means supporting an endless conveyor belt on said modular carriages so as to define a continuous upper load carrying work run and a lower return run, said belt support means including a belt guidance arrangement between the adjacent ends of each connected pair of carriages comprising a pair of vertically spaced guide rollers about which the work run is looped, one roller of each pair of guide rollers being supported on one of the corresponding pair of connected carriages and the other roller being supported on the other of said corresponding connected carriages, said rollers having axes of rotation lying in substantially parallel planes and being cooperative with said conveyor belt to define a reach between said guide rollers which is twisted generally about a longitudinal twist axis and is subjected to transverse components of tension forces acting on opposite sides of said longitudinal twist axis when the belt is turned through an angle by relative articulated movement between the corresponding connected carriages, said belt support means further including means supporting at least one roller of said pair of rollers to enable selective adjustment between the rollers in the longitudinal direction of belt movement in a manner to balance the sum of the transverse components of tension forces acting on opposite sides of said longitudinal twist axis and thereby maintain the conveyor belt in predetermined trained relation on said rollers.

2. A mobile articulated conveyor apparatus as defined in claim 1 including a common drive line extending generally longitudinally of the interconnected carriages, each pair of support wheels being operatively associated with said drive line so as to be rotatably driven by said power means.

3. A mobile articulated conveyor apparatus as defined in claim 1 wherein the rearward end of each interconnected modular carriage and the forward end of the adjacent modular carriage are interconnected such that articulated movement therebetween is effected about an imaginary vertical axis normal to the longitudinal axes of said adjacent module carriages at the point of intersection of said longitudinal axes during relative articulated movement between said adjacent carriages.

4. A mobile articulated conveyor apparatus as defined in claim 1 wherein each of said guide rollers has a crowned configuration.

5. A mobile articulated conveyor apparatus as defined in claim 1 including means interconnecting adjacent ends of said modular carriages so as to substantially prevent pivotal movement of said adjacent ends in a vertical plane.

6. A mobile articulated conveyor apparatus as defined in claim 5, wherein said interconnected carriages define horizontal pivot axes intermediate the length of each carriage so as to enable relative articulated movement between adjacent carriages in a generally vertical plane.

7. A mobile articulated conveyor apparatus as defined in claim 1 including a plurality of idler roller assemblies supported along the length of each of said carriages, said idler roller assemblies being operative to support said upper work run so as to adjacent ends of each connected pair of carriages, said conveyor belt return run being looped about each second pair of rollers as it passes along the conveyor between adjacent interconnected carriages.

8. A mobile articulated conveyor apparatus comprising, in combination, a plurality of pivotally interconnected modular carriages each of which has a pair of transversely aligned support wheels intermediate its longitudinal length so as to track behind the wheels of the preceding carriage during longitudinal movement of the conveyor apparatus, selected ones of said carriage having power means operative to selectively drive the support wheels on said carriages, and means supporting an endless conveyor belt on said modular carriages so as to define a continuous upper load carrying work run and a lower return run, said belt support means including a belt guidance arrangement between the adjacent ends of each connected pair of carriages comprising a pair of vertically spaced guide rollers about which the work run is looped, said rollers having axes of rotation lying in substantially parallel planes and being cooperative with said conveyor belt to enable angling of the belt during relative articulated movement between adjacent carriages while maintaining the conveyor belt in predetermined trained relation on said rollers, the rearward end of each interconnected modular carriage and the forward end of the adjacent modular carriage being interconnected through a parallelogram arm arrangement such that articulated movement between adjacent carriages is effected about an imaginary vertical axis normal to the longitudinal axes of said adjacent modular carriages at the point of intersection of said longitudinal axes during relative articulated movement between said adjacent carriages.

9. A mobile articulated conveyor as defined in claim 8 wherein the rollers of each pair of vertically spaced rollers are crowned.

10. A mobile articulated conveyor as defined in claim 8 wherein said rollers of each pair of rollers over which said work run is looped are cooperative with said work run so that material conveyed on said work run from a forward end of said conveyor toward a rearward end thereof is discharged from the work run as it passes over the uppermost roller of each pair and is received by the work run after it loops about the lowermost roller of the corresponding pair of rollers.

11. A mobile articulated conveyor as defined in claim 8 including a second pair of vertically spaced rollers between the adjacent ends of each connected pair of carriages, said conveyor belt return run being looped about each second pair of rollers as it passes along the conveyor between adjacent interconnected carriages.

* * * * *